United States Patent [19]

Azancot

[11] Patent Number: 5,694,316

[45] Date of Patent: Dec. 2, 1997

[54] METHOD AND APPARATUS FOR THE RECORDING, PROCESSING, AND RECONSTRUCTION OF A STANDARD RATE HIGH-RESOLUTION VIDEO SIGNAL FOR REAL-TIME CARDIOVASCULAR ANGIOGRAPHY AND ANGIOPLASTY PROCEDURES

[76] Inventor: Isaac Azancot, 9 rue Barbette, Paris, France

[21] Appl. No.: 13,950

[22] Filed: Feb. 4, 1993

[30] Foreign Application Priority Data

Feb. 4, 1992 [FR] France ................... 9201228

[51] Int. Cl.⁶ ................................. G06F 159/00
[52] U.S. Cl. ................... 364/413.21; 364/413.19; 382/232
[58] Field of Search .............. 364/413.13, 413.14, 364/413.18, 413.19, 413.21, 413.22, 413.23; 382/56, 130, 232, 233, 264

[56] References Cited

U.S. PATENT DOCUMENTS

| | | |
|---|---|---|
| 4,458,267 | 7/1984 | Dolazza .................. 364/413.23 |
| 4,533,947 | 8/1985 | Smith ..................... 364/413.14 |
| 4,674,125 | 6/1987 | Carlson et al. . |
| 4,720,871 | 1/1988 | Chambers . |
| 4,730,212 | 3/1988 | Wojcik et al. . |
| 4,764,975 | 8/1988 | Inoue . |
| 4,792,900 | 12/1988 | Sones et al. . |
| 4,924,521 | 5/1990 | Dinan et al. . |
| 5,014,127 | 5/1991 | Richards . |
| 5,267,153 | 11/1993 | Shimura et al. .......... 364/413.13 |

FOREIGN PATENT DOCUMENTS 2562743  10/1985  France .

OTHER PUBLICATIONS

World Patents Index printout for FR 2562743 (Abstract).

Primary Examiner—Robert A. Weinhardt
Attorney, Agent, or Firm—Wolf, Greenfield & Sacks, P.C.

[57] ABSTRACT

A high-resolution medical imaging system for x-ray emission cardiovascular angiography and angioplasty procedures, allowing practitioners to acquire images in real-time on a permanent standard archiving medium without any substantial loss of resolution and to post-process as best as possible those images in real-time, simultaneously or not with another acquisition.

20 Claims, 5 Drawing Sheets

FIG. 6

METHOD AND APPARATUS FOR THE RECORDING, PROCESSING, AND RECONSTRUCTION OF A STANDARD RATE HIGH-RESOLUTION VIDEO SIGNAL FOR REAL-TIME CARDIOVASCULAR ANGIOGRAPHY AND ANGIOPLASTY PROCEDURES

TECHNICAL FIELD

The present invention concerns a method and an apparatus for recording, processing, and reconstructing a high-resolution analog video signal that is particularly useful for real-time cardiovascular angiography and angioplasty procedures. Within this disclosure, the term "high-resolution analog video signal" is meant to refer to an analog video signal that may be interlaced or non-interlaced, of which the so-called interlaced mode 1249-line system is one example which has the potential capacity of higher spectral content than a low-resolution system, of which the so-called 625-line system is one example.

BACKGROUND

In the digital processing of high-resolution images, an analog video image is divided into a large number of picture elements (pixels) which form a matrix on the order of 1024. For each of these pixels, the analog signal is converted into a number that represents a gray level, the total number of possible gray levels being dependent on the number of bits with which the conversion is done (for example, a digital signal with 8 bits provides 256 gray levels). This digital image may then be processed using a computer and an image processor to, for example, enhance the contrast, detect changes in the contents of images, or improve the image by reducing the random noise content not included in the original signal. This technique is particularly useful in cardiovascular angiography for the x-ray examination of, for example, blood vessels and the cardiac muscle, using injection of a contrast agent that is opaque to x-rays in the endo-cardiac cavities.

The subtraction of an image obtained after the injection of the contrast agent from an image obtained before the injection, or from the average of many images, allows the inside of vascular structures made opaque by the contrast agent to be clearly visible.

However, in the domain of cardiology, the high-resolution technique faces some difficulties for the following reasons:

A) The extremely fast motion of the heart requires a high speed acquisition rate (around 25 images/second), while the currently-available rates range from 25 to 30 images/second with a 512×512 matrix (so called "low-definition"), and 6.25 to 7.50 images/second with a 1024×1024 matrix (so called "high-definition"). The current rates are not limited by the analog-to-digital converter or the image processor that are able to operate at 25 images/second, but rather because the magnetic storage units which are available for a reasonable cost are not able to digitally archive, in real-time, at 25 images/second in a 1024×1024 matrix. This is why cardiovascular angiography systems are generally available with only a 512×512 matrix. This leads to a loss of resolution in the processing chain; in fact, the analog signal acquisition chain has a resolution of approximately 40 line pairs/ centimeter, while the 512×512 matrix has a resolution of no more than 23 line-pairs/centimeter, and the 1024×1024 matrix has a resolution of no more than 36 line-pairs/ centimeter. As can be seen, there is a loss of resolution in going from the analog signal acquisition chain to a 512×512 matrix or a 1024×1024 matrix, but the loss of resolution when using a 512×512 matrix is particularly significant.

Moreover, the current systems work in the following manner: the video signal is digitized and then archived in real-time on an erasable temporary medium. It is then necessary by post-processing to transfer this information onto a high-capacity permanent digital medium, such as a laser written digital optical disk. This leads to the following major difficulties for the user:

1. Transfer time: several minutes are necessary for transferring the information from the temporary disk to the permanent medium.
2. Playback time: to read the stored information afterward, the same time is necessary to retransfer the information to the temporary disk.
3. System standstill: during the time of transfer, playback or processing, the digital system is blocked and so it is not available for the recording of new data, thus considerably limiting its use in daily practice.
4. Data transmission difficulties: the digital data can only be read back:
   on a costly digital system. In fact, there is no standardized low-cost digital reader;
   on a digital system from the same manufacturer. In fact, there is no agreement between manufacturers about digital archival standards for this application.

Thus, laboratories are only able to transmit to their correspondents, at a reasonable cost, low-resolution magnetic video tapes—with a significant degradation of quality of the images, slow motions or stop motions—or analog optical disks in, for example, a 625-line format. In the case of an analog optical disk, the quality of the document will be equivalent to the original document, if the original document has been recorded in a 512 matrix, but:

1. Those mediums do not allow recording documents in high-definition (1024 matrix).
2. The already high cost of a digital system is further significantly increased by the need for an analog optical disk (AOD for the rest of this text) reader-recorder.
3. Finally, the documents transferred to AOD cannot be post-processed (i.e., subtraction, enlargement, measurements, etc.) by the AOD itself, thus reducing one of the benefits of digitalization and requiring supplemental image-processing equipment to perform these functions.

Those difficulties explain why today users still continue, in the majority of cases, to record their documents both on the digital system and on 35 mm film, which results in increased cost, working, and archiving difficulties.

B) Because of the importance of cardiac and mediastinal structure motions during coronary angiography, the subtraction from only one mask (or reference image) is often the cause of artifacts which makes the digital image unusable.

SUMMARY OF THE INVENTION

The purpose of the present invention is to provide a high-resolution imaging system particularly adapted for cardiology, allowing the practitioner to acquire real-time images directly on a permanent medium, and to post-process those images simultaneously or sequentially with another acquisition. Within this disclosure, the term "resolution" refers to the structural quality of an image, while "definition" refers to the format of the input or output device.

In the present invention, a high-resolution image is acquired and processed into a format that can be stored on an analog archiving medium in real-time. The stored image can then be used to reconstruct a signal corresponding to the original high-resolution image which can then be viewed by a physician, or post-processed to provide additional diagnostic information.

The present invention provides a method and apparatus of recording a high-resolution video signal, particularly useful for cardiovascular angiographic and angioplastic systems, comprising the steps of, during a real-time processing and recording phase:

a) the high-resolution analog video signal is digitized in order to obtain a high-definition digital video signal;
  b) the high-definition digital video signal is processed to improve contrast and saturation to provide an adjusted high-definition digital video signal (known as the "window level");
  c) an integrated mask signal is provided by temporal averaging of a number of high-definition digital video signals;
  d) a matrix convolution of a predetermined order is performed on the adjusted high-definition digital video signal to provide a convolved high-definition digital video signal;
  e) the convolved high-definition digital video signal is reduced by averaging to a compressed convolved low-definition digital signal;
  f) the compressed convolved low-definition digital video signal is converted into a standard video rate and format (such as NTSC or PAL) low-definition analog video signal;
  g) the low-definition analog video signal is recorded on an analog archiving medium, such as an analog optical disk; and
  h) the steps d–g are repeated for the integrated mask signal, and the result is recorded on the same medium as the low-definition analog video signal.

The low-definition analog video signal may be in interlaced or non-interlaced mode. During the phase of real-time reconstruction:

a) the standard video rate and format low-definition analog video signal is read;
  b) the low-definition analog video signal is digitized in order to obtain a low-definition digital video signal from the analog archiving medium;
  c) an expansion by linear interpolation is done on the low-definition digital video signal to obtain a high-definition digital video signal;
  d) a matrix deconvolution of the above-mentioned predetermined order is performed on the high-definition video signal to obtain a deconvolved high-definition digital video signal; and
  e) the deconvolved high-definition digital video signal is converted into a high-definition analog video signal may be used in a non-interlaced mode.

The high-resolution analog video signal may also be digitized to obtain a high-definition digital video signal to which may be applied desirable digital processing functions (for example, subtraction, measurements, functional calculations . . . ) to provide additional diagnostic information.

The invention contributes to resolving the previously mentioned difficulties by allowing:

1. To record without significant degradation a high-resolution video signal (1024 matrix) in real-time and at 25 images/second.

2. To record in real-time the entire information on a permanent archiving medium that has, for practical purposes, an unlimited lifetime and does not experience image degradation.

3. To reread and post-process—on a secondary independent console, and therefore simultaneously with other acquisitions—in real-time and without delay the entire recorded information.

4. To transmit the archived information in a standard format, notably on AOD, allowing its playback by a commercially available reader—the reader being low in cost and with a high quality of images, slow motions and stop motions.

5. To reduce notably and at three levels the cost of the system:
  a) reduced industrial cost of the acquisition and digital archiving system;
  b) elimination or reduction in the necessity of the 35 mm film chain (camera, film processor, film reader, reagents . . . ); and
  c) lower operating cost tied to the lower cost of consumables in comparison with the 35 mm film.

6. To manage in a computerized manner the entirety of the archived images and patient information, with the ability to insert into the system a network of images and numeric and alphanumeric data.

7. Optionally, to have the ability to add to this system a method of synchronized—acquisition described in French Patent Letters 2,562,743 the disclosure of which is hereby incorporated by reference in its entirety—in order to allow a significant reduction of (by a factor of 2 or 3) the delivered x-ray dose to the patient and the physician who performs the examination.

BRIEF DESCRIPTION OF THE DRAWINGS

The invention will be better understood from a reading of the following description with reference to the annexed drawings in which like elements have been given the same reference characters and wherein.

DETAILED DESCRIPTION

Figure 1:
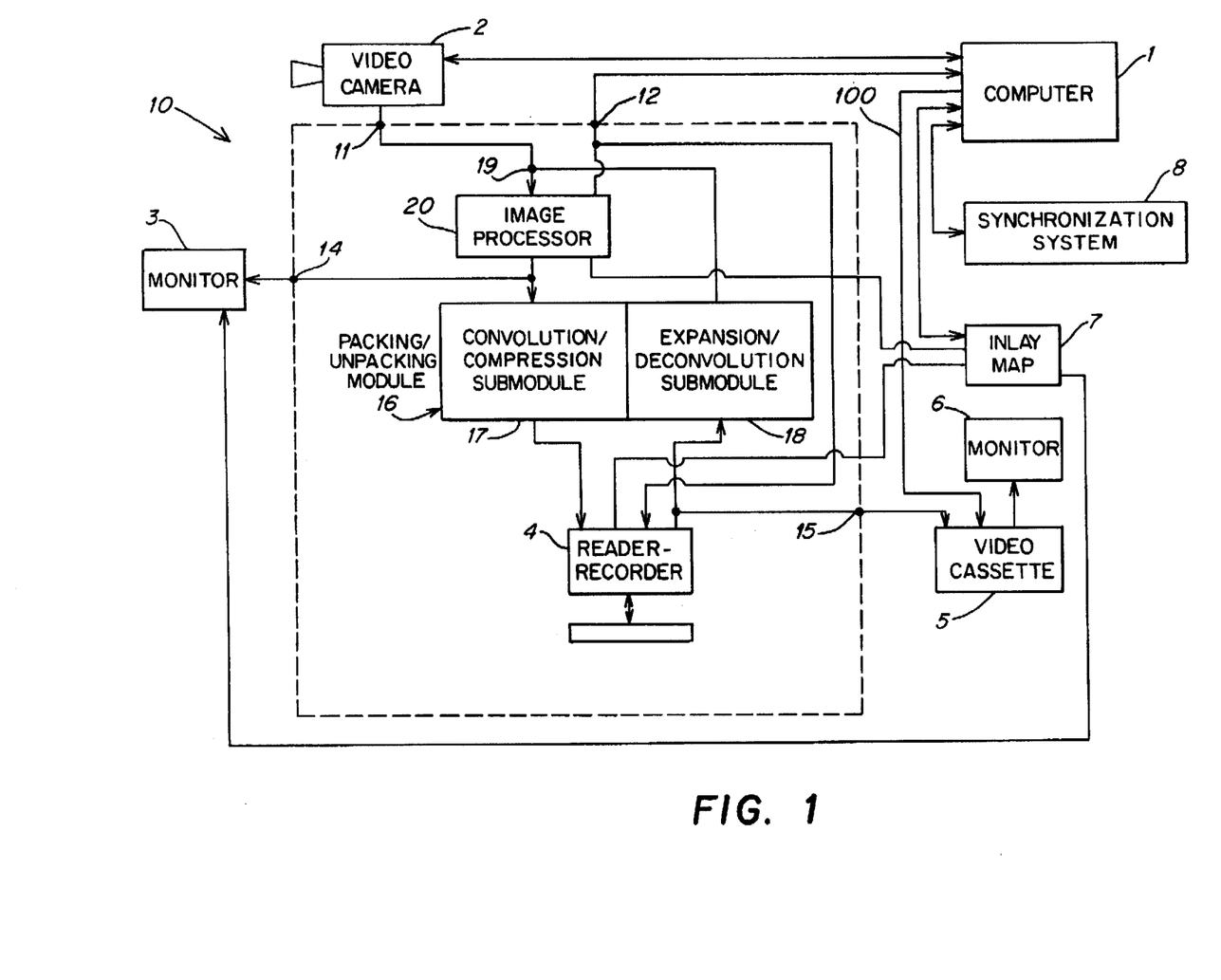
FIG. 1 is a diagrammatic and functional representation of an apparatus in accordance with the present invention, in a basic configuration.

A preferred embodiment of the apparatus of this invention is represented functionally in FIG. 1 by way of interconnected modules.

The apparatus 10 comprises a number of connecting parts to external apparatus:

- A high-definition analog video input port 11 for reception of a high-resolution analog video signal from a video camera 2.
- A high-definition analog video output port 14 for the high-definition visualisation of the high-definition analog video signal coming from an image processor 20 on a high-definition monitor 3.
- An input/output port 12 of the command busses for synchronization between the apparatus 10 and a computer 1.
- A low-definition analog video output port 15 for recording the low-definition analog video signal coming from the reader-recorder 4 to a video cassette 5.

The apparatus 10 comprises essentially a processing/post-processing module or image processor 20, a packing/unpacking module 16 and a 625 line, 25 images/second AOD reader-recorder.

The invention and the implemented function will be better understood by following the progress of the high-definition analog video signal delivered by the video camera 2. All of the following operations are in real-time, except when expressly stipulated. All of the operation synchronization commands are done by the computer 1.

Figure 2:
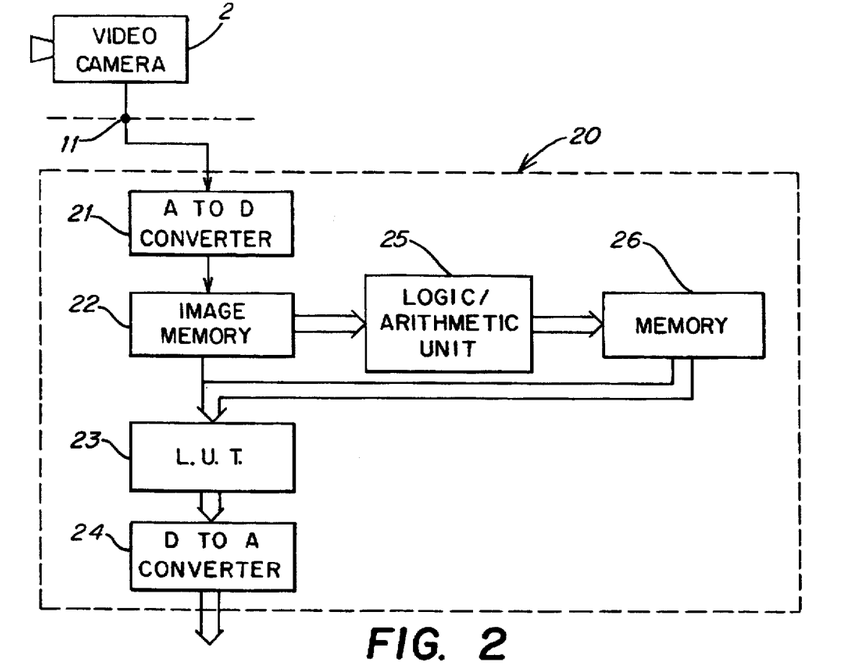
FIG. 2 is a diagrammatic and functional representation of an image processor, in its part related to the processing phase.
Figure 3:
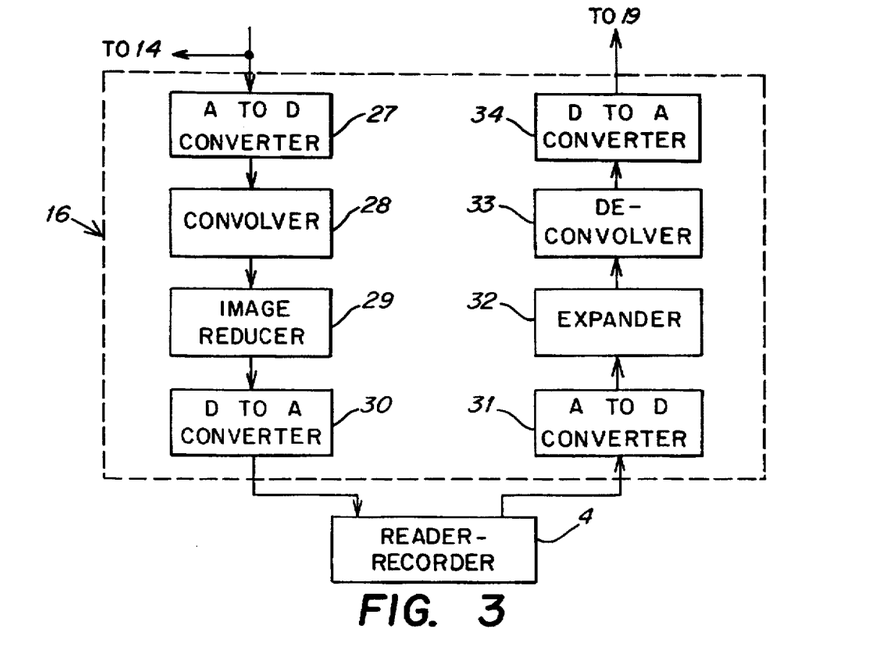
FIG. 3 is a diagrammatic and functional representation of a convolution—compression/expansion—deconvolution module being a part of the apparatus in accordance with the present invention.

The purpose is to acquire and process, for example, a non-interlaced mode 1249-line, 25 images/second signal into a signal that can be stored on the AOD by convolving and compressing the acquired and digitized signal. The non-interlaced mode 1249-line, 25 images/second high-resolution analog video signal is applied to the input port 11 of the apparatus 10 where it is digitized into a 1024×1024 matrix with a depth of at least 8 bits to provide a high-definition digital video signal, then digitally processed by the module 20 as follows. The high-definition digital video signal from the analog-to-digital converter 21 takes two processing paths as represented in FIG. 2. On one hand, there is a direct circuit wherein the high-definition digital video signal goes from the image memory 22 to the luminance look-up table 23 that provides an adjustment of the contrast and the saturation. The adjusted signal is then provided to digital-to-analog converter 24 to provide an analog signal for the reconstruction of an interlaced mode 1249-line, 25 images/second high-definition analog video signal which is made available at the module 20 output. On the other hand, the signal coming from the memory 22 is processed by an integrated mask creation circuit including logic/arithmetic unit 25 where the signal is added as a 16-bit signal to a prior image stored in a second memory 26 that can average up to 256 images (about 10 seconds of images at 25 images/second) in order to obtain the average of those images. The averaged image is then sent to look-up table 23 and digital-to-analog converter 24. The interlaced high-definition analog video signal is provided at high-definition video output port 14, and is also sent to the convolution/compression submodule 17 of the packing/unpacking module 16. Referring to FIG. 3, this signal is digitized by the analog-to-digital converter 27 into a 1024×1024 matrix with a depth of at least 8 bits, in a preferred embodiment, in non-interlaced mode. Those images then undergo two successive processes (see FIG. 3): the first is a matrix convolution, in convolver 28, of a predetermined order of at least three-by-three, five-by-five, or more, wherein the value of the luminance of each pixel is replaced by a value that depends on the value of the luminance of the pixel itself and also of the pixels around it, as a function of coefficients that define the convolution matrix according to the Kernel size.

This operation processes, in successive portions, three-by-three (or five-by-five, or more) successive lines of the image. The matrix coefficients could remain fixed for all the lines of the entire image, in which case many matrixes could be available for clinical evaluation. The matrixes could also be varied to provide dynamic coefficients for adaptive processing. The second process is an image reduction in image reducer 29 that comprises the removing of unusable line borders, since typically the image is displayed in a ⁴⁄₃ format and used in a circle whose diameter represents only the ¾ of digitized information on each line. The reducer 29 may reduce the number of pixels by averaging to a format, for example, of 640 pixels of the useful part of each line and averaging the columns to a format, for example, of 512 pixels per column. Averaging is done among pixels in a predetermined number of columns to provide a reduced number of pixels per line and among pixels in a predetermined number of lines to provide a reduced number of pixels per column. In the described embodiment, the predetermined number is two, but any arbitrary number could be used. In another embodiment, the convolution step may be skipped by not performing the convolution at all and relying on averaging alone to achieve compression of the image. In another embodiment, the convolution step may be effectively by-passed by using convolution kernel coefficients that result in the signal being unchanged by the convolution step. Averaging alone is then used to achieve compression of the image. The convolved and compressed images in the resulting 640×512 matrix may then be converted into an interlaced 25 image/second 625-line low-definition analog video signal by the digital-to-analog converter 30. The submodule 18 then generates a signal in a proper format (for example PAL or NTSC having a standard video rate and format; these formats typically operating in an interlaced mode) for archiving on AOD. This signal is transmitted to the AOD reader/recorder through the low-definition analog video output port 15. The recorded information includes the reduced convolved processed images from the direct circuit from the module 20, called "sequence" images, sequentially followed by the result of the averaging of the whole set of stored images in the memory 26 of the module 20, called the "integrated mask."

In parallel with the acquisition of the images that comprise a sequence, the computer 1 may write on the AOD data-processing track (64 kilobits on present-day systems) via connection 100 additional digital information, such as a set of digitally coded data allowing a complete characterization of the patient and each of the x-ray sequences. Alternatively, computer 1 can, via connection 100, simultaneously record two properly encoded tracks of physiological signals (such as electrocardiogram or pressure) with the images on the AOD data-processing track.

The different recorded sequences on the AOD may be read back and displayed on a 625-line monitor 6 and stored on a VHS, SVHS or U-MATIC commercial video-cassette type medium 5. The sequences are not read back directly from the AOD such as 4 in FIG. 3, but referring to FIG. 3, go through the following steps:

The low-definition analog video signal (which may be interlaced or non-interlaced) that comprises a sequence and its integrated mask that comes from the AOD reader/recorder is sent to expansion/deconvolution submodule 18 of the packing/unpacking module 16 where it is digitized by analog-to-digital converter 31 (for example, into a 640×512 matrix) with a depth of at least 8 bits. This signal may be a non-interlaced mode signal. This signal then successively undergoes two processes (FIG. 3):

An expansion by expander 32 to a 1024×1024 matrix by linear interpolation of lines and columns of the digital matrix from analog-to-digital converter 31, then a deconvolution of the same predetermined order that was used by convolver 28 of the expanded signal by deconvolver 33. In another embodiment, the deconvolution step may be skipped and linear interpolation alone used to expand the signal. In another embodiment, the deconvolution step may be effectively by-passed by using deconvolution kernel coefficients that result in the signal being unchanged by the deconvolution step. Linear interpolation alone is then used to achieve decompression of the image. The purpose is to obtain a deconvolution corresponding to the convolution done during the step of recording, so as to reconstruct a signal as near as possible to the original. The so expanded deconvolved signal is converted by the digital-to-analog converter 34 into a non-interlaced mode 1249-line, 25 images/second reconstructed signal that may be used to directly drive the input of image processor 20.

In the processor 20, the reconstructed signal may undergo digital post-processing operations, particularly a subtraction of the integrated mask, magnifications, and functional measurements. The signal coming from the image processor 20 is displayed on the high-definition monitor 3. The post-processed signal (subtracted, magnified, with the result of calculation, etc.) is a new signal derived from the reconstructed signal. This new signal may then be archived in that state after the previously archived sequences by following the recording steps described above. The operator may then define and archive processed, subprocessed, magnified, etc ... images meant to summarize the main characteristics of the examination and to edit the fixed images (on reprograph or video printer).

Two particular systems may be attached to the above described system:

An "inlay map" 7 containing a set of alphanumerical information, such as the name of the patient, the date, the recording conditions, the angulation device positions, etc., may be provided. To avoid having this information degraded by the manipulations done on the video signal, this information is digitally recorded on the AOD and overlayed on the image when displayed on the high-definition monitor 3. The recorded signals on the AOD sound tracks may also be displayed by overlaying on the high-definition monitor 3, after suitable decoding.

A synchronization system 8, such as the one being the subject matter of the French Patent Letters No. 2,562,743, allows a reduction, by optimization, of the x-ray emission during the creation phase of the original high-definition analog video signal resulting in a reduction of the x-ray delivered to the patient and the operator.

Figure 4:
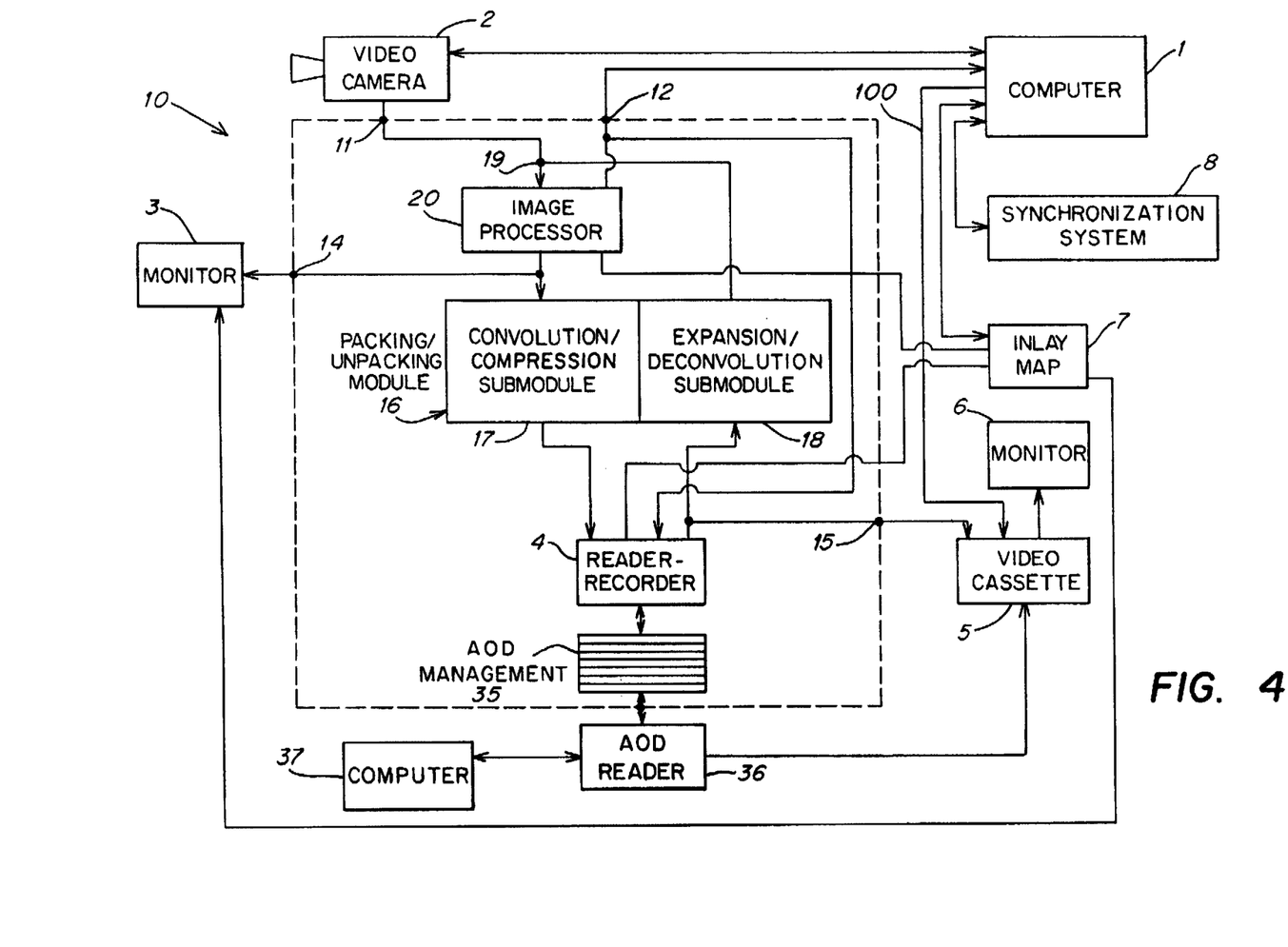
FIG. 4 is a diagrammatic and functional representation of an apparatus in accordance with the present invention, in a configuration that allows simultaneous consultation and acquisition of images.

In FIG. 4, the apparatus is illustrated in a configuration allowing simultaneous consultation and acquisition. This configuration allows archiving AOD reader/recorder recorded sequences on a device 35 allowing management of fifteen AODS. In this way already-recorded sequences may be consulted from a simple AOD reader 36, the control and reading being assumed by a second computer 37, thus allowing the main system to record or post-process another case.

Figure 5:
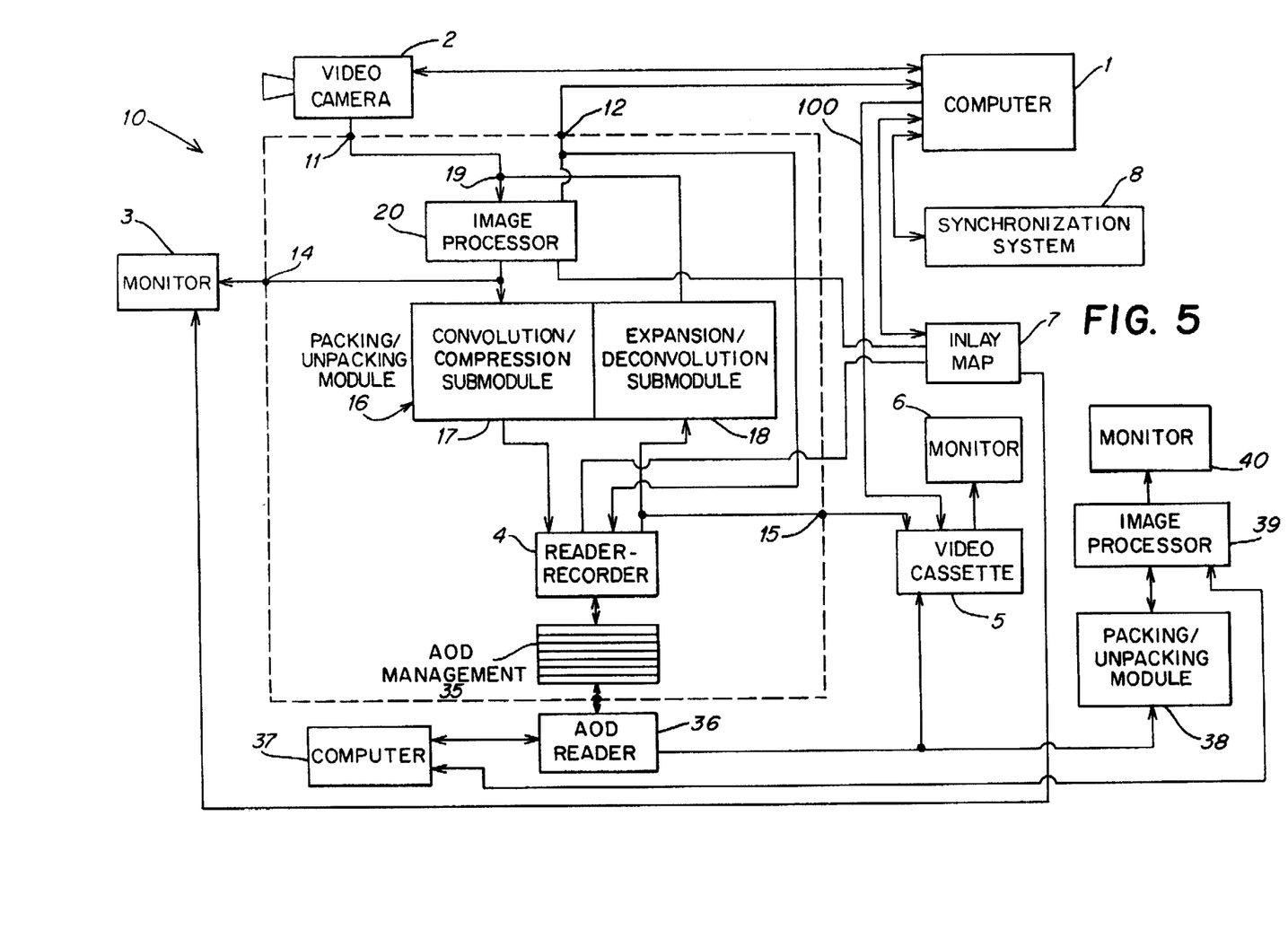
FIG. 5 is a diagrammatic and functional representation of an apparatus in accordance with the present invention, in a configuration for independent post-processing.

In FIG. 5, the apparatus is illustrated in a configuration that provides independent post-processing. This configuration has a post-processing subsystem unit that comprises its own packing/unpacking module 38, image processor 39, and high-definition monitor 40, the subsystem being managed by the computer 37. This allows post-processing a case while-recording or post-processing another case on the main system.

Figure 6:
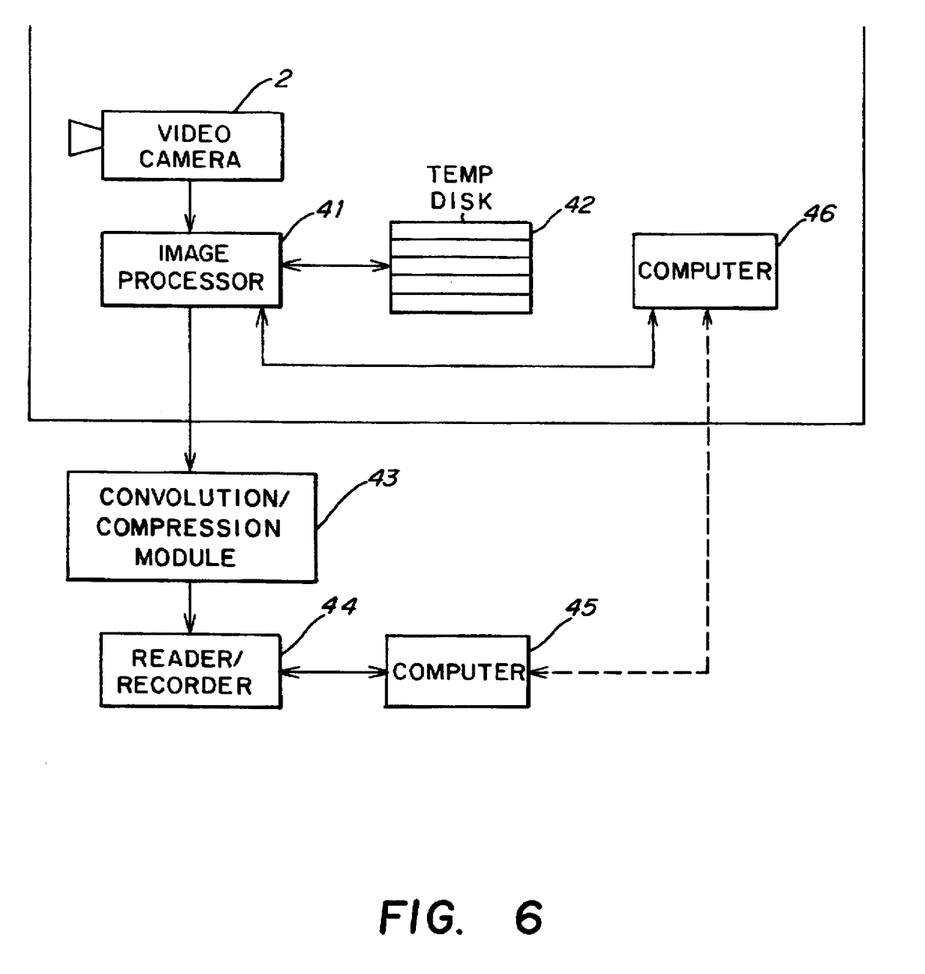
FIG. 6 is a diagrammatic and functional representation of an apparatus in accordance with the present invention, in an adaptive configuration for existing products.

In FIG. 6, the apparatus is illustrated as being adapted to an existing system. The 1249-line signal coming from the image processor 41 is introduced in the convolution compression module 43, and then recorded by the AOD reader/recorder 44. A simple link is provided between the computer 45 controlling the AOD reader/recorder 44, and the computer 46 controlling the image processor 41, in a way to transmit synchronization commands from the computer 46 to the computer 45. In that way, the signal is recorded simultaneously and in real-time on fast temporary disk 42 and on the AOD. The operator may afterward post-process the recorded signal stored on the fast temporary disk and store the result on the AOD. The operator may afterward read back the sequences and post-process from the AOD under the control of computer 45.

The invention is usable with other high-resolution standards such as 60 Hz, 1049 lines. It also is usable with other low-definition analog mediums.

Having thus described one particular embodiment of the invention, various alterations, modifications, and improvements will readily occur to those skilled in the art. Such alterations, modifications, and improvements are intended to be part of this disclosure and are intended to be within the spirit and scope of the invention. Accordingly, the foregoing description is by way of example only and is not intended limiting. The invention is limited only as defined the following claims and the equivalents thereto.

What is claimed is:

1. A method of real-time processing and recording of a high-resolution analog video signal of the type used in angiographic and angioplastic systems, comprising the steps of:

a) digitizing a high-resolution analog video signal to obtain a high-definition digital video signal for forming a digital image comprised of pixels arranged in lines and columns;

b) performing a matrix convolution of a predetermined order on the high-definition digital video signal to provide a convolved signal;

c) reducing by respectively averaging pixels in the convolved signal to provide a compressed convolved low-definition digital video signal;

d) convening the low-definition digital signal into a low-definition analog video signal; and e) recording the low-definition analog video signal on an analog archiving medium; and further comprising reconstructing a high-definition analog video signal corresponding to the high-resolution analog video signal in real-time according to the steps of:

f) reading the low-definition analog video signal from the analog archiving medium;

g) digitizing the low-definition analog video signal to provide a low-definition digital video signal;

h) performing a linear interpolation expansion on the low-definition digital video signal to rovide a high-definition digital video signal:

i) performing a matrix deconvolution of the predetermined order on the high-definition digital video signal to provide a deconvolved high, definition digital video signal; and j) converting the deconvolved high, definition digital video signal into a reconstructed high-definition analog video signal.

2. The method of claim 1, wherein the averaging is respectively performed using pixels on different lines to create an average number of pixels in a column and pixels in different columns to create an average number of pixels on a line.

3. The method of claim 1, further comprising the step of adjusting contrast and saturation in the high-definition digital video signal to provide an adjusted high-definition digital video signal.

4. The method of claim 3, further comprising the step of averaging previously acquired adjusted high-definition digital video signals to create an integrated mask signal.

5. The method of claim 4, further comprising the step of averaging the adjusted high-definition digital video signal with the integrated mask signal to update the integrated mask signal.

6. The method of claim 5, further comprising repeating steps b, c, d and e for the integrated mask signal to provide a final integrated mask signal, and recording the final integrated mask signal on the same medium as the low-definition analog video signal.

7. The method of claim 6, further comprising repeating steps f, g, h, and i for the final integrated mask signal to provide a reconstructed integrated mask signal for use in post-processing.

8. The method of claim 7, further comprising the step of recording additional digital information, comprising alpha-numerical information, on the analog archiving medium.

9. The method of claim 7, wherein the reconstructed high-definition analog video signal is further processed to provide a first post-processed signal, and wherein the post-processing includes at least one of magnifying, filtering, and measuring.

10. The method of claim 9, wherein the post-processed signal is further processed according to steps b, c, d, and e to provide a second post-processed signal.

11. An apparatus for real-time processing and recording of a high-resolution analog video signal of the type generated by cardiovascular angiographic and angioplastic systems, comprising:

an image processor that receives an original or reconstructed analog video signal and provides, at an output thereof, a respectively processed or post-processed high-definition analog video signal;

a convolution-compression module, coupled to the output of the image processor, that receives the high-definition analog video signal and convolves the high-definition analog video signal using a matrix having a predetermined order and compresses the high-definition analog video signal to provide a low-definition analog video signal; and an analog archiving medium reader-recorder, coupled to the convolution-compression module, that receives the low-definition analog video signal and writes the low-definition analog video signal into an analog archiving medium; and further comprising an apparatus for real-time reconstruction of a high-definition analog video signal corresponding to the high-resolution analog video signal, comprising:

an analog archiving medium reader-recorder that reads the analog archiving medium to retrieve the low-definition analog video signal from the analog archiving medium;

an expansion-deconvolution module, coupled to the analog archiving medium reader, that receives the retrieved low-definition analog video signal and expands the low-definition analog video signal using interpolation to provide a high-definition analog video signal and deconvolves the high-definition analog video signal to provide a reconstructed high-definition analog video signal.

12. The apparatus of claim 11, wherein the image processor comprises:

a direct process circuit including an analog-to-digital converter to convert the original or reconstructed analog video signal into a high-definition digital video signal, an image storage memory, at least one luminance look-up table for adjusting contrast and saturation of the high-definition digital video signal, and a digital-to-analog converter that provides a high-definition analog video signal; and an integrated mask creation circuit including image integrating logic-arithmetic units and a memory, electrically coupled to the image storage memory and the look-up table.

13. The apparatus of claim 12, wherein the reader-recorder is a low-resolution standard format laser writing analog optical disk reader-recorder.

14. The apparatus of claim 13, wherein the reader-recorder is coupled to a device for managing a plurality of analog optical disks, said device being coupled to an analog optical disk reader and to a synchronization and command computer, thereby allowing simultaneous recording and retrieving of images.

15. The apparatus of claim 14, further comprising a separate subsystem including an analog optical disk reader-recorder coupled to a packing-unpacking module that is coupled to an image processor that is coupled to a high-definition monitor, wherein the subsystem is synchronized and controlled by the computer, thereby allowing independent post-processing of images.

16. The apparatus of claim 11, wherein the high-definition analog video signal is a non-interlaced mode 1249-line, 25 images/second signal.

17. The apparatus of claim 16, wherein the low-definition analog video signal is an interlaced mode, 625-line signal.

18. The apparatus of claim 16, wherein the low-definition analog video signal is an interlaced mode, 525-line signal.

19. The apparatus of claim 11, wherein the high-definition digital video signal is a 1024×1024 matrix signal.

20. The apparatus of claim 11, wherein the low-definition digital video signal is a 640×512 matrix signal.

* * * * *